March 8, 1966  R. N. SCOTT  3,239,015
SOIL TILLAGE AND PLANTING TOOL CARRIERS
Filed Aug. 26, 1963  2 Sheets-Sheet 1

INVENTOR.
Robert Norman Scott
BY
Attorney

March 8, 1966   R. N. SCOTT   3,239,015
SOIL TILLAGE AND PLANTING TOOL CARRIERS
Filed Aug. 26, 1963   2 Sheets-Sheet 2

INVENTOR.
Robert Norman Scott
BY
Attorney

United States Patent Office

3,239,015
Patented Mar. 8, 1966

3,239,015
SOIL TILLAGE AND PLANTING TOOL CARRIERS
Robert Norman Scott, Box 114, R.R. 3,
Washington, Iowa
Filed Aug. 26, 1963, Ser. No. 304,561
2 Claims. (Cl. 172—413)

This invention relates to agricultural implements and more particularly to improvements in soil tillage, fertilizing, and planting tool carriers of the trailing type.

The outstanding purpose of the tool carrier is the fact that it can be fitted and operated simultaneously with any one or more of several types of soil tillage machines that a farm operator might wish to mount on the tool carrier operated in conjunction with fertilizing, insecticide, herbicide spreading, and crop or nursery seedling planting equipment.

By so mounting and operating two or more pieces of equipment simultaneously, the farm operator may save considerable time and money in his farming operations.

By the nature of their construction and operation, some types of soil tillage machines are more adaptable to the task of producing an acceptable seed bed, especially in adverse conditions.

Mounting individual implements in common on a tool carrier, such as the invention herein described, opens up vast new possibilities of several operations simultaneously with such implements thus saving considerable time, fuel, and expense in farm operation.

In the accompanying drawings forming part of this application:

Figure 1:
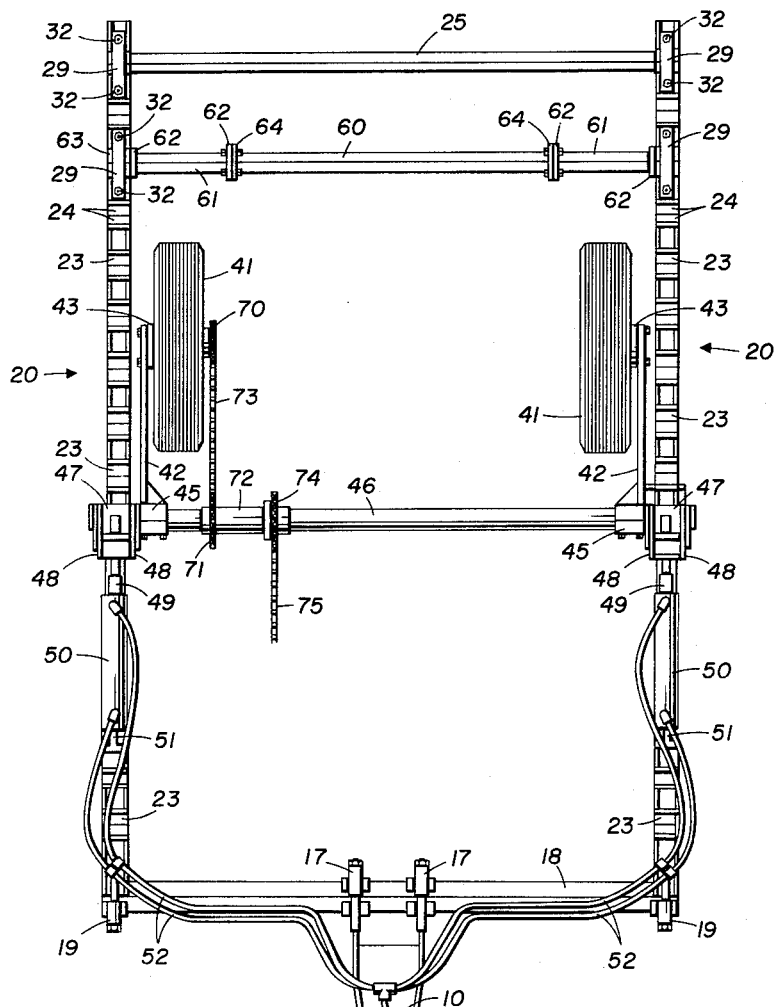
FIGURE 1 is a top view of the tool carrier constructed in accordance with the present invention.

Turning now to the drawings, the cool carrier of the present invention employs a hitching assembly comprising a tongue 10 whose forward end is bifurcated by two vertical bracket plates 11 secured thereto which receive a horizontal arm 12 secured therebetween for vertical adjustment. The forward end of arm 12 is also bifurcated at 12′ to receive a hinge block 13 pivoted therebetween about a horizontal hinge pin 14. Hinge block 13 pivotally receives a vertical hinge pin 15 to which may be attached the draw bar 16 of a tractor or other suitable towing means (not shown), thus providing a swivel connection between the latter and the tool carrier.

The rear end of tongue 10 is equipped with suitable clamps 17 releasably connecting it centrally along a horizontal, transversely disposed forward tool bar 18. The latter in turn is releasably connected at its ends by clamps 19 to the forward ends of a pair of laterally spaced side frame members 20, each formed by a bottom wall 21 and a pair of spaced side walls 22, extending rearwardly therefrom. The upper edges of side walls 22 of frame members 20 are provided with a series of transversely disposed and aligned tool bar mounting notches 23 of upwardly facing V-shape spaced therealong from front to rear. Each notch 23 is equipped with a pair of short plates 24 welded transversely between its respective side walls 22 of frame members 20 providing a seat for receiving the ends of one or more tool bars 25 therebetween similar to tool bar 18. Anchor pin holes 26 are provided transversely through the side walls 22 of frame members 20 centrally between adjacent notches 23. Pin holes 26 receive anchor pins 27 passing through the lower end of eyebolts 28 disposed within and between side walls 22 and extending upwardly through the ends of clamp caps 29, the latter having downwardly facing V-shaped notches 30, complementary to notches 23, formed by plates 31 welded in recesses therein. When the nuts 32 on the upper end of eyebolts 28 are turned down, the ends of tool bar 25 are clamped between notches 23 and 30. The clamps 17 and 19 for tongue assembly 11 and tool bar 18, respectively, may, as shown, be identical with those for tool bars 25. Accordingly, tool bars 25 may each be moved about to a plurality of different positions along the frame members 20.

A supporting and transport assembly for the tool carrier employs a pair of wheels 40, equipped with heavy duty implement type tires 41, journaled at the trailing ends of a pair of wheel arms 42. The journals for wheels 40 are attached to wheel arms 42 by means of flanges 43 bolted to the former at one of a number of bolt locations 44 providing along wheel arms 42 in order to adjust the location of wheels 40 along wheel arms 42. The forward ends of the latter are releasably dogged, as by split clamps 45, to a wheel arm shaft 46 extending between frame members 20. Shaft 46 is journaled in bearings 47 releasably secured in a pair of corresponding notches 23 by means of a pair of clamp caps 29′. To the ends of shaft 46 are secured the inner, bifurcated ends of crank arms 48 which straddle frame members 20 and bearings 47. The outer ends of crank arms 48 are pivotally attached to the piston rods 49 of a pair of suitable, two way hydraulic rams 50, the ends of whose cylinders are pivotally attached to brackets 51 releasably secured in turn in a pair of corresponding notches 23 by means of a pair of clamp caps 29″ identical to clamp caps 29 and 29′. Rams 50 are provided with suitable hydraulic hoses 52 for connection into the tractor's hydraulic pressure supply system (not shown).

Figure 2:
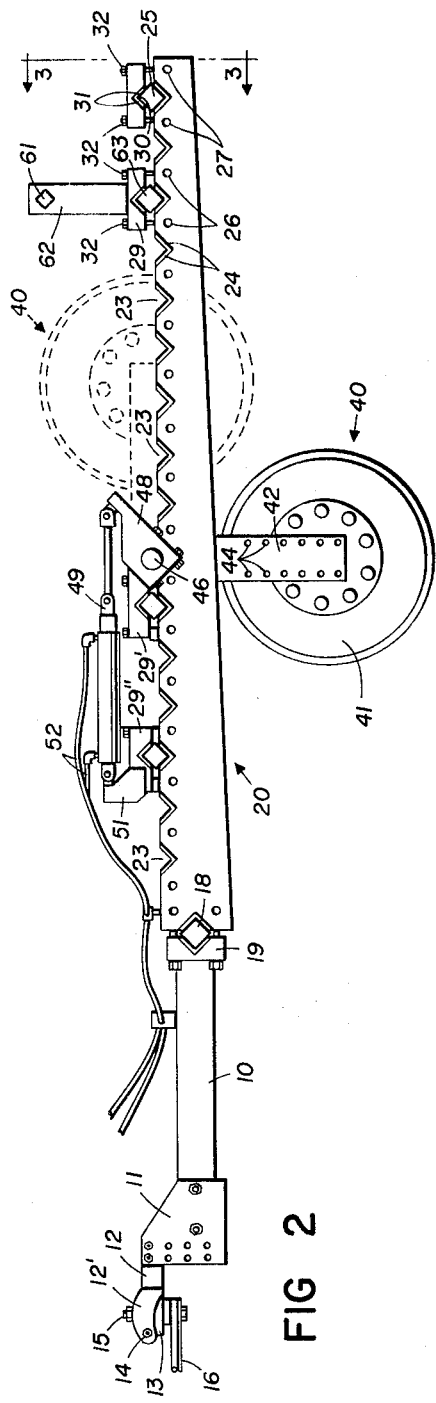
FIGURE 2 is a side view of the tool carrier constructed in accordance with the present invention.
Figure 3:
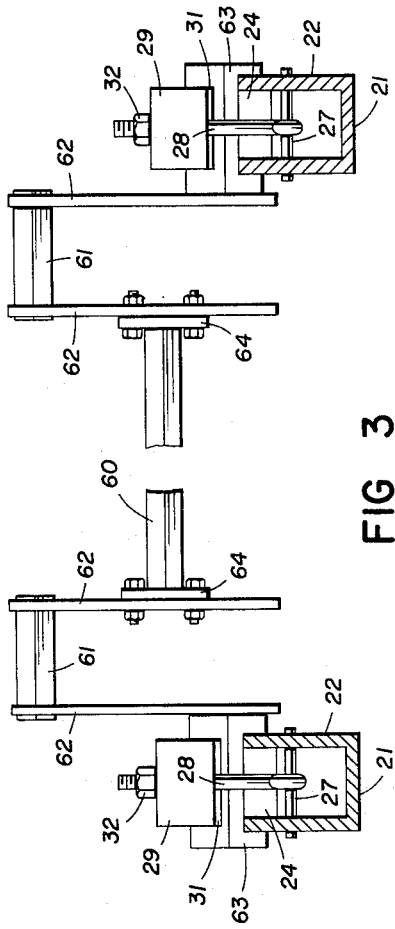
FIGURE 3 is a view taken along the line 3—3 of FIGURE 2.

During operation of the tool carrier hydraulic rams 50 readily controls the clearance above the ground of any tillage or planting tools attached anywhere on tool bars 25. To raise the tool carrier for increased clearance or to transport same, the operator actuates rams 50 so that crank arms 48 rotate wheel arm shaft 46 clockwise with respect to FIGURE 2 in order to move wheel arms 42 and wheels 40 downwardly to the position shown in full lines in FIGURE 2. In order to lower the tool carrier, instead, to its tillage and planting position, the foregoing operation is merely reversed, and the tool carrier may be lowered to any intermediate position between its maximum height shown in full lines in FIGURE 2 and its minimum height shown in FIGURE 1 and in broken lines in FIGURE 2.

The tool carrier may additionally be equipped with a vertically adjustable tool bar 60. A pair of short, horizontal bars 61 are secured between the upper ends of two pairs of laterally spaced, vertical plates 62, the lower ends of each outboard one of which is fitted with a horizontally outwardly extending tool bar stub 63 secured in notches 23 by clamp caps 29. The height and length of each bar 61 is such so that tool bar 60 may be disposed adjacent wheels 40 without interference with the latter when in their elevated position shown in FIGURE 1. The inner plates 62 are each equipped with vertically spaced bolt locations between corresponding ones of which are bolted flanges 64 secured to the end faces of tool bar 60. The purpose of adjustable tool bar 60 is to enable the operator to attach any suitable tool bar mounted planter unit offered as farm equipment. Various types of planter units are built in different models each of which must be carried at widely varying distances above the ground level. The vertical adjustability of tool bar 60 provides this necessary variation above the ground and additionally allows operation of tillage tools simultaneously with the planter units at a height independent of that of the latter. It is recommended that where both soil tillage tools and planter units are operated on the tool carrier simultaneously, the soil tillage tools be mounted on the tool carrier ahead of wheel arm shaft 46 and the planting equipment to the rear of the latter.

Rotary power required for fertilizer, soil chemical treating or planter units may also be supplied by forward travel of the tool carrier. For this purpose, a driving sprocket 70 is attached to the inboard side of one wheel 40 for driving rotation thereby. A driven sprocket 71, aligned with sprocket 70, is fixed to a sleeve 72 rotatable upon wheel arm shaft 46 and connected to sprocket 70 by means of a suitable roller chain 73. An implement drive sprocket 74 is fixed to sleeve 72, in axially spaced relation to sprocket 70, and drives in turn a second roller chain 75 leading to the implement unit or units to be driven (not shown).

When the tool carrier is properly and fully equipped, it is possible to accomplish up to 12 operations simultaneously during passage of the carrier through the field, thus saving the farm operator considerable time, labor and money in his farming operations.

Having thus described my invention, what I claim and desire to protect by Letters Patent is:

1. In an implement carrier comprising a pair of transversely spaced and aligned fore and aft frame members disposed generally horizontally, said frame members having a plurality of pairs of transversely aligned and extending notches therealong, a plurality of clamps having complementary notches adapted to be adjustably connected adjacent each of the notches in said frame members to define a plurality of openings for clampingly receiving tool support bars extending between said frame members, a wheel support bar rotatably mounted in aligned openings defined between said clamps and frame members, at least one wheel arm adjustably connected to said support bar, a wheel mounted on said arm in spaced relationship to said wheel bar and for rotation about a transverse axis with respect to said frame members, adjusting means mounted on at least one of said frame members, means connecting the adjusting means to said wheel support bar for rotating the same to adjust the wheel relative to said frame, said wheel support bar and adjusting means being connectable to said frame members at a plurality of corresponding locations between the fore and aft ends thereof, and draft means connected to another support bar mounted in aligned openings on the forward ends of said frame members.

2. An implement carrier comprising a pair of horizontally disposed, laterally spaced frame members extending fore and aft, the forward end portions of said frame members being joined by a tow member effective upon attachment to tractor means to tow said carrier over the ground, a suspension assembly including a pair of laterally spaced wheels effective to support said carrier above and to rotatably engage the ground when said carrier is towed as aforesaid, said wheels being connected adjacent said frame members by means permitting vertical adjustment of said wheels relative to said frame members, each of said frame members having a plurality of transversely aligned positions therealong for receiving and locating one or more tool bars thereon, a vertically adjustable tool bar extending between corresponding ones of said tool bar positions on said frame members, said adjustable tool bar having a central section and two end sections secured to said frame members, the two pairs of adjacent ends of said central and end sections each having means permitting adjustment of the height of said central section relative to and independently of said end sections and frame members, and means for releasably securing tool bars between corresponding tool bar positions on said frame members.

References Cited by the Examiner

UNITED STATES PATENTS

| | | | |
|---|---|---|---|
| 1,938,023 | 12/1933 | Ingalls | 112—146 |
| 2,588,585 | 3/1952 | Stockmar | 172—177 |
| 2,734,440 | 2/1956 | Davis | 172—691 |
| 2,767,631 | 10/1956 | Mowbray | 172—106 X |
| 2,952,322 | 9/1960 | Jurcheck | 172—151 |

OTHER REFERENCES

John Deere Operator's Manual, No. OM–N38–156, February 1956, No. 8 Digest, pages 3 and 14–20.

ABRAHAM G. STONE, *Primary Examiner.*

ARNOLD RUEGG, T. GRAHAM CRAVER,
*Examiners.*

JOE O. BOLT, *Assistant Examiner.*